(12) United States Patent
McManus et al.

(10) Patent No.: US 7,340,431 B1
(45) Date of Patent: Mar. 4, 2008

(54) SYSTEMS AND METHODS FOR DETERMINING THE VALUE OF ASSETS

(75) Inventors: Douglas Alexander John McManus, Bethesda, MD (US); Asim Husain, Fairfax, VA (US); Pamela Williams Sims, Arlington, VA (US); Robert LaVerne Parson, Ashburn, VA (US); Limin Fu, Bethesda, MD (US)

(73) Assignee: Federal Home Loan Mortgage Corporation (Freddie Mac), McLean, VA (US)

( * ) Notice: Subject to any disclaimer, the term of this patent is extended or adjusted under 35 U.S.C. 154(b) by 204 days.

(21) Appl. No.: 10/330,212

(22) Filed: Dec. 30, 2002

Related U.S. Application Data

(63) Continuation of application No. 10/206,957, filed on Jul. 30, 2002, now abandoned.

(60) Provisional application No. 60/308,100, filed on Jul. 30, 2001.

(51) Int. Cl.
*G06Q 40/00* (2006.01)

(52) U.S. Cl. .................. 705/37; 705/36 R; 705/35; 705/15

(58) Field of Classification Search ............ 705/35–37, 705/38, 36 R; 706/15
See application file for complete search history.

(56) References Cited

U.S. PATENT DOCUMENTS

| | | | | |
|---|---|---|---|---|
| 5,361,201 | A | 11/1994 | Jost et al. ................... | 364/401 |
| 5,812,988 | A * | 9/1998 | Sandretto .................. | 705/36 R |
| 6,249,775 | B1 * | 6/2001 | Freeman et al. ............. | 705/36 |
| 6,321,212 | B1 * | 11/2001 | Lange ......................... | 705/37 |
| 6,633,875 | B2 * | 10/2003 | Brady .......................... | 707/10 |
| 6,792,399 | B1 * | 9/2004 | Phillips et al. ............ | 705/36 R |
| 2002/0032629 | A1 * | 3/2002 | Siegel et al. ................. | 705/36 |
| 2002/0035530 | A1 * | 3/2002 | Ervolini et al. .............. | 705/36 |
| 2002/0038272 | A1 * | 3/2002 | Menchero .................... | 705/36 |
| 2003/0004845 | A1 * | 1/2003 | Takeda et al. ................ | 705/36 |
| 2003/0033261 | A1 * | 2/2003 | Knegendorf ................ | 705/400 |
| 2003/0154150 | A1 * | 8/2003 | Wefers et al. ................ | 705/36 |
| 2003/0208428 | A1 * | 11/2003 | Raynes et al. ................ | 705/36 |
| 2004/0024695 | A1 * | 2/2004 | Melamed ..................... | 705/38 |

OTHER PUBLICATIONS

"Fannie May and Freddie Mac Mortgage myopia" The Economist, Jul. 2002, pp. 64-65.

* cited by examiner

*Primary Examiner*—Harish T. Dass
(74) *Attorney, Agent, or Firm*—Finnegan, Henderson, Farabow, Garrett & Dunner LLP

(57) ABSTRACT

Systems and methods are provided for analyzing a set of assets. Generally, a distribution is computed for a characteristic of assets, setting a range in a tail of the distribution and partitioning the range into at least one partition. Subsequently, a multiplier is assigned to each partition, wherein the multiplier represents how the characteristics affect the risk associated with an asset. These multipliers can be used in a risk analysis.

30 Claims, 12 Drawing Sheets

SYSTEMS AND METHODS FOR DETERMINING THE VALUE OF ASSETS

CROSS REFERENCE TO RELATED APPLICATION

This application is a continuation of application Ser. No. 10/206,957, filed Jul. 30, 2002 now abandoned, and is related to and claims the benefit of priority under 35 U.S.C. 119(e) to U.S. Provisional Patent Application No. 60/308,100 filed on Jul. 30, 2001, the disclosure of which are expressly incorporated herein by reference in their entirety.

BACKGROUND OF THE INVENTION

I. Field of the Invention

The present disclosure generally relates to systems and methods for performing asset valuations. More specifically, the present disclosure relates to systems and methods for determining the value and marketability of an asset or pool of assets.

II. Background Information

Generally, the value of an asset is based on various factors such as the stream(s) of expected cash flows associated with the asset. Accordingly, assets can be valued by estimating the cash flow stream by: (1) determining the expected cash flow for each time period; (2) determining the risk associated with receiving each cash flow; and (3) discounting each cash flow by an expected rate of return, which may be based on the risk of receiving the cash flow. To obtain the present value of an asset, all of the discounted cash flows may be summed together.

When purchasing an asset such as real property the purchaser often contracts for a mortgage on the asset and agrees to make periodic payments toward the mortgage. Often the time period for making each periodic payment is monthly. If the property is sold before the mortgage has been paid in full, which is not unusual, the balance of the mortgage may become the last payment. Thus, for real property, the expected cash flows to the lender may comprise either monthly payments until the mortgage is paid in full or monthly payments plus a final payment. For the lender to value real property, the risk associated with receiving each of the periodic payments and in some cases, the risk of receiving the remaining loan balance if the property is liquidated before the mortgage has been paid in full, must be determined. In such cases, the valuation may be derived from analyzing each of the monthly payments and analyzing the final payment.

A challenge with producing a valuation of an asset is determining the risk associated with receiving the expected cash flow. To determine risk, most valuation techniques use either a rudimentary approximation or a subjective assignment of risk in the discount rate and the expected cash flow. Understandably, failing to accurately account for a cause of risk can lead to undervaluation or overvaluation errors. These valuation errors can be significant for financial institutions which conduct transactions where multiple assets are combined to form pools that are then bought and sold.

One historical method of valuation is an appraisal, which subjectively compares a set of characteristics of a subject asset to the same set of characteristics of a standard, with the standard being a comparable asset. The term "subject asset" typically refers to the asset under investigation for which an appraised value is sought. An important consideration for appraising the value of a subject asset is the development of the standard. One method to form the standard has been to select a set of comparable assets, whose sales prices are known. Each asset in the set of comparable assets is as similar as possible to the subject asset. The term "comparable asset" refers to assets, other than the subject asset, that are used to form the standard and assist in appraising the subject asset. In the case of real property, the comparable assets typically include properties that are physically located near the subject asset.

A common use for an appraisal is in connection with the sale of a property. The seller will typically contract with an appraiser to conduct an appraisal, and the appraisal becomes a substantial factor in setting the asking price. Similarly, the prospective buyer may also contract an appraiser to provide an appraisal for the property. A more commonplace use of an appraisal is for mortgage lending purposes imposed by the lender so that the lender can have an objective opinion on the value of the property. In the most common scenario, the lender will initiate the process and procure an appraisal of the subject property. Depending on the outcome of the appraisal, negotiations may take place between the buyer and seller to determine the price that the asset sells for.

Problems arise, however, when the appraisals do not accurately capture the actual value of the property. In this case, the seller may unjustifiably demand a price for the property that is greater than the actual value of the property. Buyers and lenders, also relying on appraisals, may be led to believe that the asking price is justified and pay/lend the negotiated price based on incorrect appraisals. Thus, the borrower can become bound to a loan, the amount of which, is greater than the actual value of the property.

With these properties, there is a greater risk of default because the borrower may not be able to pay the unjustified, high mortgage payments. Generally, the term "default" is used to describe the situation where payments on a loan remain unpaid for a predetermined period of time. Similarly, if a default does occur on these properties, the severity may be greater than what would have been expected with an accurate appraisal. Severity is a term used to describe the loss incurred should a loan default, including lost principal and interest as well as costs incurred during the default process.

In addition, when the buyer, now the owner of the property, wants to sell the property, he/she will be more likely to attempt to sell the property for more than the price that informed purchasers would be willing to pay. In this situation it may take longer than expected to sell the property. Alternatively, the owner may be forced to lower the price of the property in order to make the sale. If a balance remains on the mortgage, both the buyer and the lender are exposed to the risk of not being able to sell the property for an amount that is sufficient to cover the difference between the price paid by the owner and the price that the asset can be sold for in the market. In the alternative, if there is no outstanding balance, the owner and/or lender may take a loss on the sale.

One significant factor of risk that has often been difficult to quantify in an appraisal process is the risk associated with marketability of a subject asset. Broadly speaking, marketability reflects the asset's liquidity. Clearly, the ability to liquidate an asset will influence how much the asset can be sold for, in part because individual purchasers and investors do not want to purchase assets that cannot be readily resold at a later time. If a marketability issue exists, the price of the asset may have to be lowered so that it can be sold. While appraisers can observe marketability and may include a discussion of it in an appraisal report, they may have difficulty in quantifying marketability, and may not relate marketability to risk.

Historical data has shown that an asset's marketability significantly impacts the risk associated with receiving the cash flow. This is especially the case when markets face a down-turn. And failing to account for a cause of risk often distorts the valuation of a subject asset.

Appraisals have historically been conducted by qualified professionals known as appraisers. A common component of the appraisal process is for the appraiser to physically inspect the subject asset. While appraisers try to make appraisals as quantitative as possible, errors in valuations often occur. For example, when appraising a subject asset, the appraiser may evaluate characteristics common to the subject asset and the comparable asset. The appraiser compares the characteristics of the subject asset to the corresponding characteristics of one or more comparable assets and adjusts the sales price of the comparable asset to reflect dissimilarities between the subject asset's characteristics and those of the comparable asset. The adjusted prices for the comparable assets are then used to value the subject asset. A subject asset with characteristics similar to those of comparable assets will most likely have a value similar to that of the comparable assets. While on its face this method of comparing characteristics seems quantitative, appraisers subjectively select property characteristics, comparable assets, and give certain characteristics greater importance in one appraisal than they do in another. One appraiser may choose characteristics or comparable assets that are significantly different from those chosen by another appraiser. In addition, some appraisers emphasize the effects on value of certain characteristics more than others do.

For example, when developing the set of comparable assets, an appraiser typically chooses comparable assets physically located near the subject asset. Because the nearby assets often are not identical or even similar to the subject asset, choosing the set becomes subjective. Additionally, the appraiser may disregard nearby assets because they are not typical and the appraiser will enlarge the area around the subject asset in which they choose comparable assets in order to create a meaningful set.

One method of standardizing appraisals of real estate property has been the Sales Comparison Approach (SCA). Using this technique, prices paid in actual market transactions and current listings of similar assets are used to estimate the value of the subject asset. In the SCA, the actual sales prices of comparable assets adjusted for market conditions and differences in characteristics operate to approximate the value of the subject asset. Current listings of comparable assets are used to adjust the value of the comparable assets in both advancing and declining markets.

An inherent flaw of this approach is that the selection of the characteristics and the selection of comparable assets are subjective. Further, it may be extremely time consuming and inefficient for an appraiser to inspect many potential comparable assets and to make an explicit determination as to how similar each potential comparable asset is to the subject asset. This is especially true when multiple comparable assets or multiple characteristics are used.

In an attempt to standardize their work, appraisers have begun using computers to facilitate the appraisal of a subject asset. One such computer-based system is referred to as the Artificial Intelligence Model (AI), an example of which is disclosed in U.S. Pat. No. 5,361,201 to Jost et al. The AI system of Jost et al. determines medians, averages, and variances for various property characteristics, such as sales price, square footage, and number of bedrooms. With these variances computed, the AI system uses neural networking for "training" the system and after the system is trained, attempts to predict the future sale price of a subject property. This system, however, does not quantify risk let alone consider the impact of marketability on risk when predicting the future price of a subject property. As a result, AI systems such as Jost et al. may provide inaccurate appraisals, particularly for those properties with marketability problems.

Using approaches such as the traditional appraisal process or AI systems, the accuracy of the valuation may be susceptible to error as these approaches can ignore or misjudge key risk factors, such as marketability.

Automated tools, such as AI systems, typically make broad assumptions about the risk associated with a subject asset, either that the subject asset is conforming, non-conforming, or extremely non-conforming. Additionally, these tools may incorrectly assume that the subject asset has the same risk that it had the last time it was sold. Past valuation tools that compare characteristics of a subject asset to characteristics of comparable assets have not been capable of quantifying or accounting for marketability.

Further, appraisals can be costly and time consuming, especially when multiple assets are involved. A typical appraisal of a single asset can cost hundreds of dollars and take weeks to schedule and complete. This can be a substantial inconvenience to the individual wanting to purchase, sell or refinance a home. Even worse, however, an investor wanting to value a pool with thousands of assets may be precluded, as a practical matter, from conducting appraisals of so many assets due to time and cost constraints.

Therefore, there is an unfulfilled need to have a quantitative measure of value, ex ante, when purchasing a particular asset or making or purchasing a loan secured by a particular asset. What is needed is a method and system of providing a quantitative measure of an asset's marketability so as to accurately assess an asset's value, or the value of a pool of assets.

SUMMARY OF THE INVENTION

It is to be understood that both the foregoing general description and the following detailed description are exemplary and explanatory only, and should not be deemed restrictive of the full scope of the invention, as claimed herein.

In an embodiment of the invention, there is a method of analyzing a set of assets using a processor. The method including the steps of computing a distribution for a characteristic of a set of assets, setting a range in a tail of the distribution and partitioning the range into at least one partition. Subsequently, a multiplier is assigned to each partition, wherein the multiplier represents how the characteristics affect the risk associated with an asset. These multipliers can be used in a risk analysis.

In another embodiment of the present invention, there is a method of analyzing assets using a processor, the method including the steps of determining a correlation between at least two characteristics of an asset. A further determination is made that finds the correlation between the at least two characteristics and the risk associated with the asset. A multiplier can then be assigned to the correlation between the at least two characteristics and the risk associated with the asset.

In another embodiment of the present invention, there is a method of analyzing a set of assets using a processor, the method including the steps of providing information about a set of assets, wherein the information about the assets comprises a financial history for a loan on an asset in the set of assets, the financial history including information about actual performance of the loan, and wherein each asset has at least one characteristic capable of being quantified. The method further includes setting a range in each statistical distribution, partitioning the range into at least one partition, and determining which of the assets in the set of assets contain characteristics that fall in the range set in each of the corresponding statistical distributions. For those assets falling in the range, the method determines the partition on which the corresponding characteristic falls.

In one embodiment, the method may also include comparing the actual loan performance of the assets having characteristics that fall in the range set in each of the corresponding statistical distributions to the actual loan performance of the assets whose characteristics fall outside the range. Further, a correlation may be generated between the level of each partition and actual loan performance so that a multiplier can be assigned to each partition based on the generated correlation.

In another embodiment of the invention, there is a computer system for analyzing assets using a processor. The system including means for computing a distribution for a characteristic of a set of assets, setting a range in a tail of the distribution and partitioning the range into at least one partition. In addition, the system may also include means for assigning a multiplier to each partition, wherein the multiplier represents how the characteristics affect the risk associated with an asset. These multipliers can be used in a risk analysis.

In another embodiment of the present invention, there is a computer system for analyzing assets using a processor, the system including means for determining a correlation between at least two characteristics of an asset. The system may also include means for determining a correlation between the at least two characteristics and the risk associated with the asset. The computer system may also include means for assigning a multiplier to the correlation between the at least two characteristics and the risk associated with the asset.

In yet another embodiment of the present invention, there is a computer system for determining a value of a subject asset. The system comprises means for computing a distribution for a characteristic of a set of assets and means for comparing the characteristic of a subject asset to the distribution. The system may also include means for determining whether the characteristic of the subject asset falls within a predetermined range set within the distribution and means for assigning a multiplier to the subject asset based on a position in the predetermined range on which the characteristic of the subject asset falls.

In still another embodiment of the present invention, there is a computer system for analyzing a set of assets. The system comprises means for providing information about a set of assets, wherein the information about the assets comprises a financial history for a loan on an asset in the set of assets, the financial history including information about actual performance of the loan, and wherein each asset has at least one characteristic capable of being quantified. In addition, the system may include means for determining which of the assets in the set of assets contain characteristics that fall in the range set in each of the corresponding statistical distributions, means for determining, for those assets falling in the range, the partition on which that characteristic falls, and means for comparing the actual loan performance of the assets having characteristics that fall in the range set in each of the corresponding statistical distributions to the actual loan performance of the assets whose characteristics fall outside the range. Further, the system may include means for generating a correlation between the level of each partition and actual loan performance and a means for assigning a multiplier to each partition based on the generated correlation.

DESCRIPTION OF THE EMBODIMENTS

Figure 1:
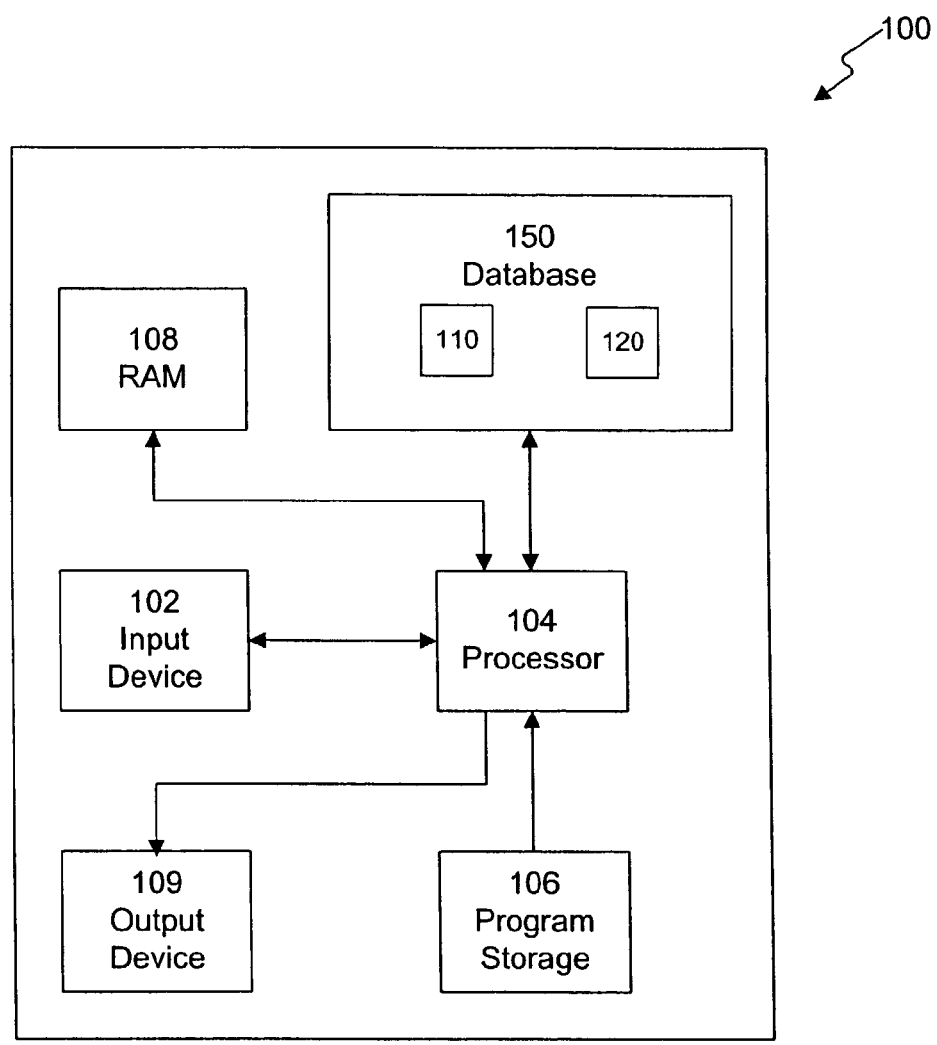
FIG. 1 illustrates an exemplary system environment, consistent with embodiments of the present invention.

Reference will now be made in detail to embodiments of the invention, examples of which are illustrated in the accompanying drawings. Wherever possible, the same reference numbers will be used throughout the drawings to refer to the same or like parts.

For purposes of illustration, systems and methods consistent with embodiments of the invention will be described in terms of the valuation of real estate, loans secured by real estate, and pools of loans secured by real estate. However, it is envisioned that embodiments of the invention are applicable to valuations of other assets, both tangible and intangible. Tangible assets may include, for instance, vehicles, boats, machinery, and other capital goods. Intangible assets may include, for example, stocks, bonds, equitable securities, commodities, accounts receivable, loans, and other intangible assets. Further, embodiments of the invention can be used to aid financial decisions about an individual asset, as well as an aggregate or pool of assets.

Embodiments of the present invention include methods and systems to more accurately value an asset. In certain embodiments of the present invention, valuations of assets are significantly affected when the asset has at least one characteristic falling within a range set in a distribution. Characteristics are indicia by which risk and ultimately value can be measured, and distributions are computed for each characteristic possessed by assets in a set of assets. The range in the distribution may correspond to the tails of the distribution. Assets having characteristics falling in the range (i.e., in the tails of the distribution) are considered 'atypical.' Further, characteristics falling in the range are outlying in the distribution and termed "outliers." This is in contrast to typical assets, whose characteristics fall outside these ranges, i.e., closer to the center of the distribution.

In the past, some of these characteristics have not been known to be correlated with the risk associated with an asset. As a result, some characteristics have been accounted for incorrectly or ignored by appraisers. In addition, past valuations often fail to consider outliers and their affect on the marketability of an asset. For example, outliers may affects the sellers ability to sell the property for the appraised value or to sell the property at all.

In a uni-dimensional basis, where one characteristic is analyzed, the characteristic may not appear to have a significant impact on risk. In some cases, the affect that a characteristic has on the value of an asset may only become apparent in extreme cases, such as when the characteristic is an outlier. Assets possessing an extreme characteristic are atypical. Embodiments of the present invention use the information that a characteristic is an outlier to evaluate assets.

In certain embodiments, ranges in the distributions are partitioned and each partition is assigned a multiplier. Multipliers quantify how each characteristic affects the risk and ultimately the value associated with an asset. Systems and methods consistent with the present invention can determine the correlation between a characteristic falling away from the center of a distribution (i.e., further in the tail of the distribution), and the risk associated with the asset. This correlation is quantified as the multiplier. With this information, a characteristic of a subject asset can be compared to the corresponding distribution computed for that characteristic for a set of assets. Each characteristic of the subject asset can be similarly evaluated. The subject asset can then be assigned the corresponding multipliers, which can then be used in a risk analysis.

In addition, the impact that one characteristic has on the risk associated with an asset may be affected by other variables, such as other characteristics of the asset, location of the assets, or aspects of the set of assets. As such, correlations can be determined that quantify the impact that other variables have on the risk associated with an asset. This correlation is used to generate an overall multiplier that can be assigned to a subject asset and used in a risk analysis.

In an embodiment of the present invention, the correlation between a first asset's characteristics and the characteristics of the assets located close to the first asset may determine whether the first asset is atypical. For example, if 95% of the houses in a neighborhood have less than 6,000 sq. ft., then a home with 50,000 sq. ft. would have an outlier characteristic in this neighborhood and would be atypical for this neighborhood. The risk associated with these atypical homes may be significantly different than the risk associated with a typical home.

As will be appreciated, an asset having a characteristic with a particular value may be atypical in one neighborhood, while an asset having the same characteristic with the same value may be atypical in another neighborhood. For example, a house with 50,000 sq. ft. may be typical in a neighborhood where almost all of the houses have about 50,000 sq. ft. However, a house having 50,000 sq. ft. would be atypical in a neighborhood where almost all houses have less than 6,000 sq. ft.

In another embodiment of the present invention, each characteristic may fall close to the center of a distribution (i.e., fall outside of the tails in the distribution) and yet significantly affect the risk associated with an asset. These cases may present multi-dimensional basis for determining atypciality. In certain embodiments, a correlation between two characteristics of an asset make the asset atypical. As an illustrative example, a six bedroom house is not be unusual, nor is a 2,000 sq. ft. house. However, a six bedroom, 2,000 sq. ft. house maybe very atypical. In this case, the correlation between two characteristics, number of bedrooms and sq. ft. make this house atypical. As will be appreciated, the correlation between multiple characteristics can be found. Additionally, assets may have both outlier and non-outlier characteristics. In such instances, correlations can be computed and the assets may be valued.

In an embodiment of the present invention, a population is used to form the distribution. In general, a population is a large body of data that is used to form a group to which a sample of subset of data is compared. In the case of assets, the population can be a large set of assets and the sample can be a smaller set of assets, such as subject assets, that are compared to the population. The concept of populations, samples, and subjects will be well known to one of ordinary skill in the art. For real property, an illustrative example of a population may be a set of assets in an area located within a predetermined distance from a subject asset. A physical inspection, investigation of public records, and/or Global Positioning Satellite technology can be used to locate the assets that make up the set. In one embodiment of the present invention, a "nearest neighbor" function from an S-PLUS software package, developed by Insightful™ may be used for statistical analysis, with exploratory data analysis being used as an efficient algorithm to determine which assets are nearby.

In multi-dimensional basis analyses, the correlation between multiple characteristics and the risk associated with the asset is determined. Specifically, a distribution is computed for each combination of characteristics for a set of assets. Ranges are set within the tails of each distribution and each range is partitioned. The risk associated with each partition is quantified and each partition is accordingly assigned a multiplier that is a quantified measure of risk. With this information, multiple characteristics of a subject asset can be compared to the corresponding distributions. The subject asset can then be assigned the corresponding multipliers. Different combinations of multipliers may effect each other in a risk analysis. As such, an overall multiplier can be computed that accounts for different combinations of multipliers.

In accordance with an embodiment of the present invention, a model may be generated that comprises analyses (including distributions) of a set of assets that can be used as a forecasting tool. The financial histories of each asset in the set of assets is known. Financial history may include information such as the actual performance of a loan on the asset and/or information about prepayment risk. The set of assets may include assets sold in the past, comparable assets, and/or other groupings of assets. As used herein, the terms "set of assets," "assets sold in the past," "comparable assets," and "other groupings of assets" are each understood to include pools of assets. Further, as used herein, the term "assets sold in the past" refers to assets that have been sold in the past.

Embodiments of the present invention identify a subject asset as having outlier characteristics by comparing the subject asset's characteristics to the distributions calculated for the corresponding characteristic for a set of assets. As used herein, the term "subject asset" is understood to include from a single subject asset to a pool of subject assets. Further, a determination may be made as to whether the characteristics of a subject asset or the correlation between characteristics fall within the range set within the corresponding distributions. Subject assets having characteristics or correlations falling in the ranges are assigned the multiplier associated with the respective partition on which the characteristic or correlation falls. In an embodiment of the invention, this multiplier is used in a standard model of risk analysis.

FIG. 1 illustrates an exemplary system environment 100 for determining the value of assets, consistent with embodiments of the present invention. Information may be entered by a user or accessed from public and/or private records and supplied to system 100 through an input device 102. A processor 104 runs software program instructions stored in a program storage 106, which direct processor 104 to perform different operations. Information about, for example, a subject asset 110 and a set of assets 120 are stored in a database 150. Based on the software programs stored in program storage 106, processor 104 accepts information from input device 102, accesses database 150, and uses a RAM 108 as a workspace. After processor 104 completes the operations of the software program instructions, a signal containing the results is sent from processor 104 to an output device 109.

Processor 104 can be a workstation, personal desktop computer, laptop, or any other processing-based platform. RAM 108, database 150, and program storage 106 can be conventional memory or storage devices, and output device 109 can be a conventional device for printing results, displaying the results on a video screen using a Windows-based interface system, and/or sending the results to a database for future access. The output of system 100 can be lists, statistical distributions, forecasts, and recommendations concerning the value and/or marketability of an asset.

Figure 2:
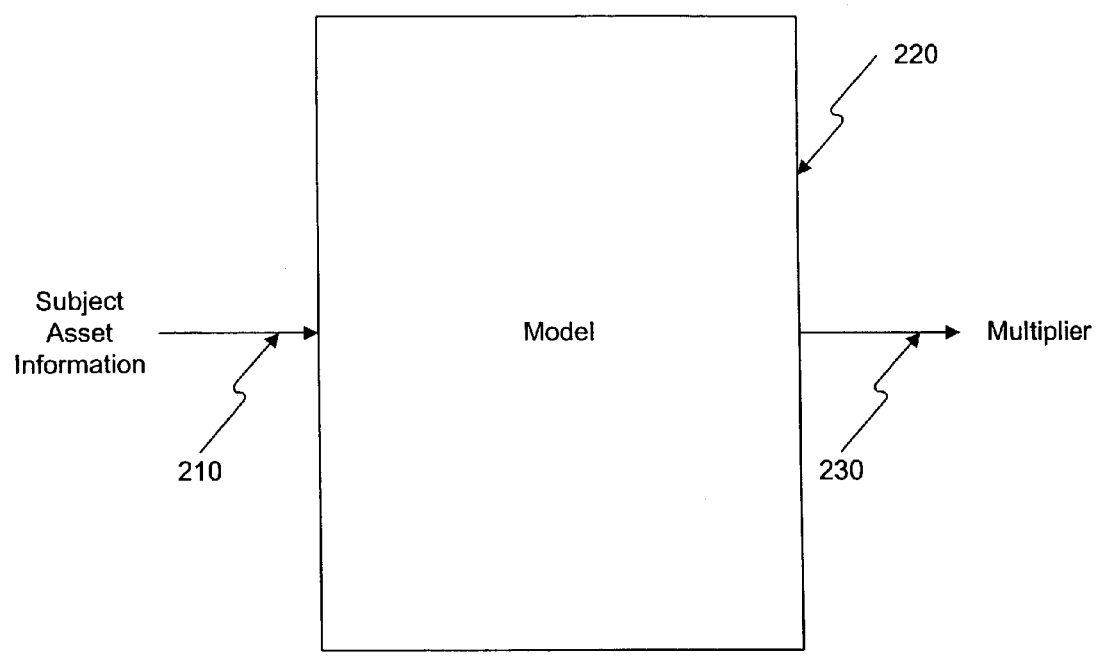
FIG. 2 illustrates the use of a model, consistent with an embodiment of the present invention.

FIG. 2 illustrates an exemplary high level diagram of the use of a model, consistent with an embodiment of the present invention. Generally, as shown in FIG. 2, information about a subject asset (shown at 210) is provided as input to a model 220. Using the information and model 220, a multiplier may be generated (shown at 230). Model 220 may comprise analyses of information about the set of assets that can be used as a forecasting tool. Such analyses may include statistical distributions, tables, charts, etc. A processor (such as processor 104) may use model 220 to compare information about subject asset 210 with the information about the set of assets. By making such a comparison, a multiplier may be generated, as further disclosed herein. In certain embodiments, this multiplier can be used in standard model risk analyses.

Figure 3:
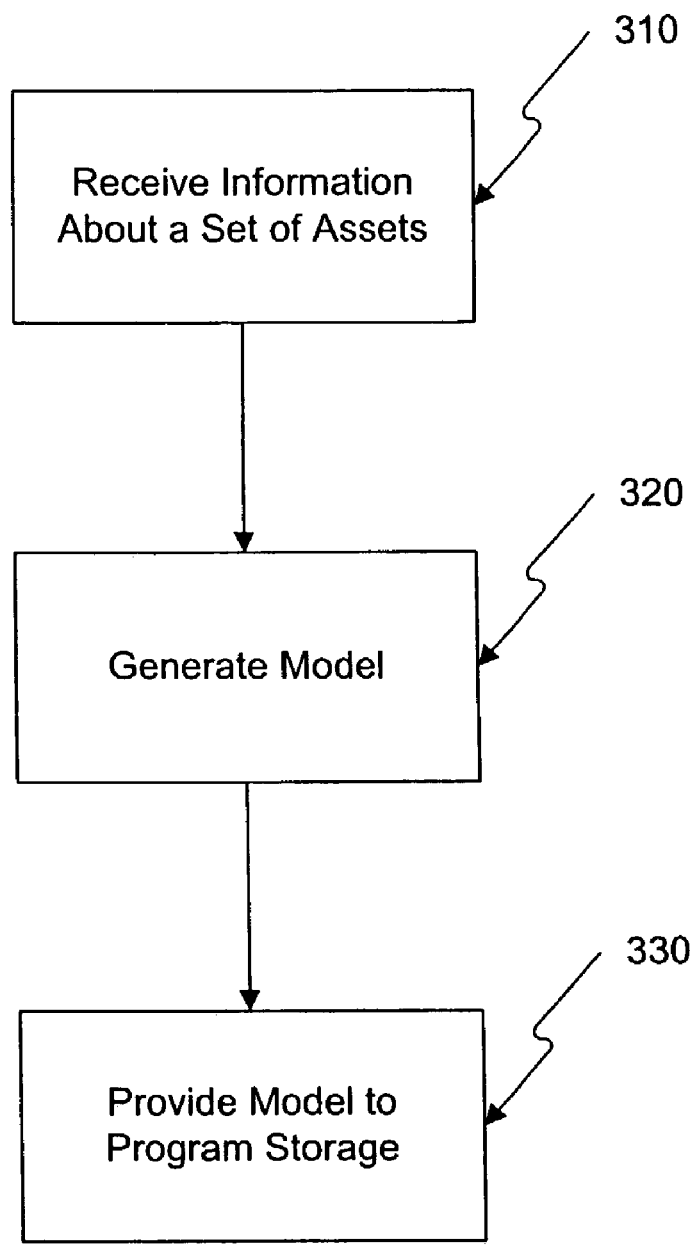
FIG. 3 illustrates an exemplary high level flow chart for providing a model to a program storage.

FIG. 3 illustrates an exemplary flow chart for generating a model, consistent with an embodiment of the present invention. The exemplary flow chart of FIG. 3 may be performed using a system environment, such as system environment 100 of FIG. 1. As illustrated in FIG. 3, input device 102 receives information about a set of assets (step 310). Processor 104 then analyzes the received information and generates model 220 (step 320). Model 220 can then be provided to program storage 106 for later retrieval and/or use by processor 104 (step 330).

Figure 4A:
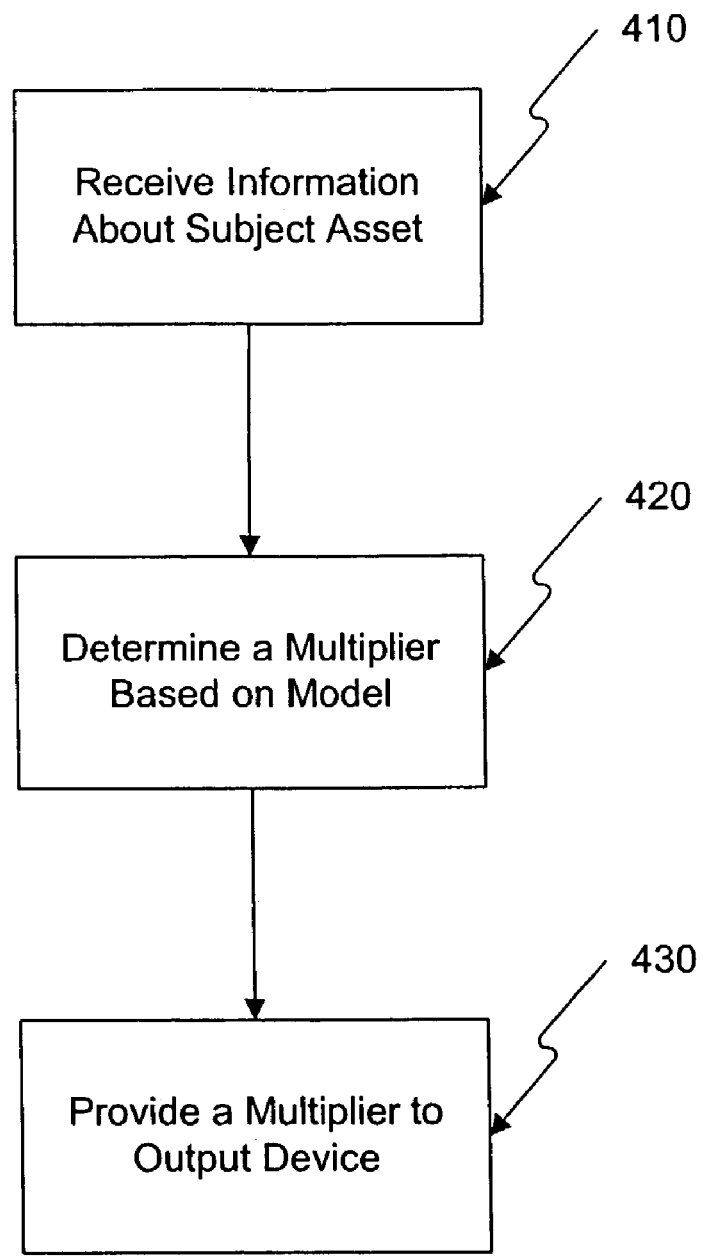
FIG. 4A illustrates an exemplary high level flow chart for providing a multiplier to an output device.

FIG. 4A illustrates an exemplary flow chart for generating a multiplier, consistent with an embodiment of the present invention. As with the method of FIG. 3, the exemplary process of FIG. 4A may be performed using a system environment, such as system environment 100 of FIG. 1. As shown in FIG. 4A, input device 102 receives information about subject asset 210 (step 410). Processor 104 then receives the information and uses model 220 to determine a multiplier for the subject asset (step 420). As further illustrated in FIG. 4A, the multiplier can then be provided to output device 109 (step 430).

Figure 4B:
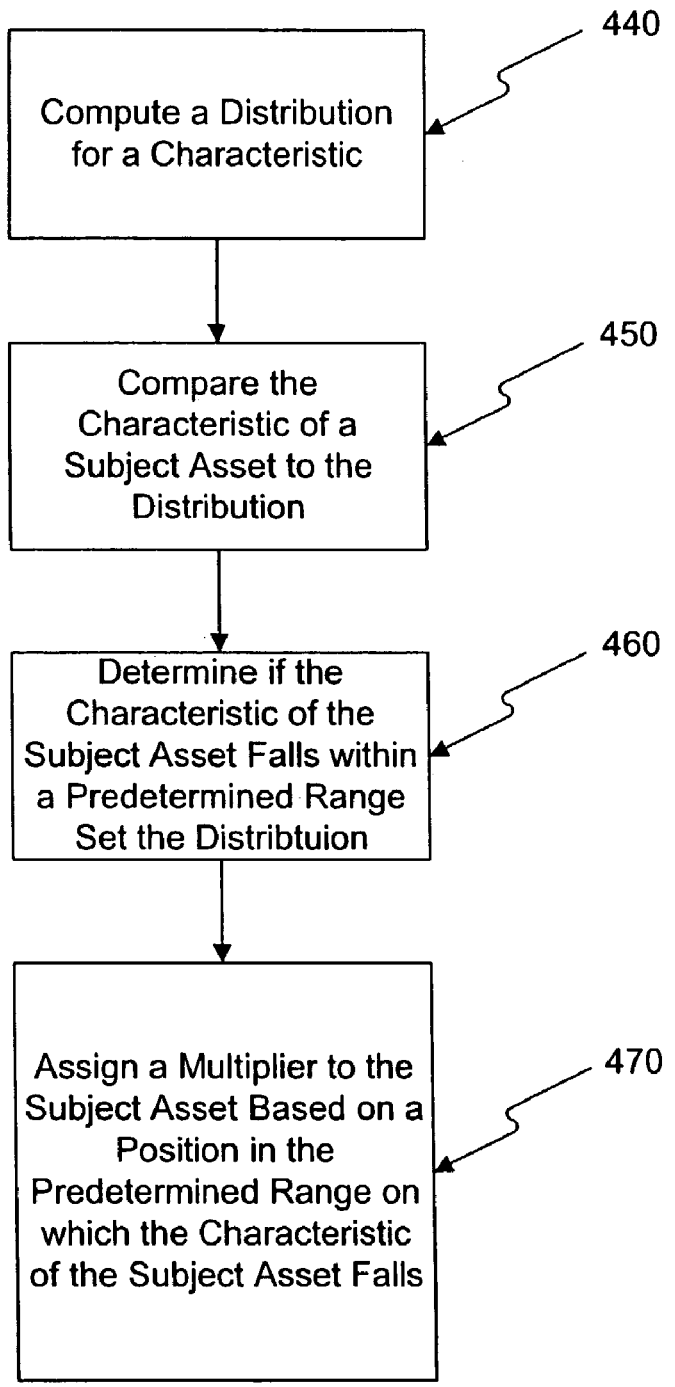
FIG. 4B illustrates an exemplary flow chart, consistent with an embodiment of the present invention, for analyzing the value of an asset.

FIG. 4B illustrates an exemplary flow chart of another process that may be performed by system environment 100. Consistent with both uni-dimensional and multi-dimensional basis, the process of FIG. 4B may be performed to assign a multiplier in order to analyze the value of an asset. As shown in the flow chart of FIG. 4B, a distribution is computed for a characteristic possessed by assets in the set asset (step 440). In addition, the correlation between multiple characteristics is also determined. The characteristics of a subject asset is then compared to the distribution (step 450). Based on this comparison, a determination is made as to whether the characteristics of the subject asset fall within the range set in the corresponding distributions (step 460). Subsequently, a multiplier is assigned to the subject asset based on a position in the range on which the characteristics and/or correlations between multiple characteristics of the subject asset fall (step 470). As further disclosed herein, conventional statistical methods may be used to generate and assign a multiplier.

Figure 5:
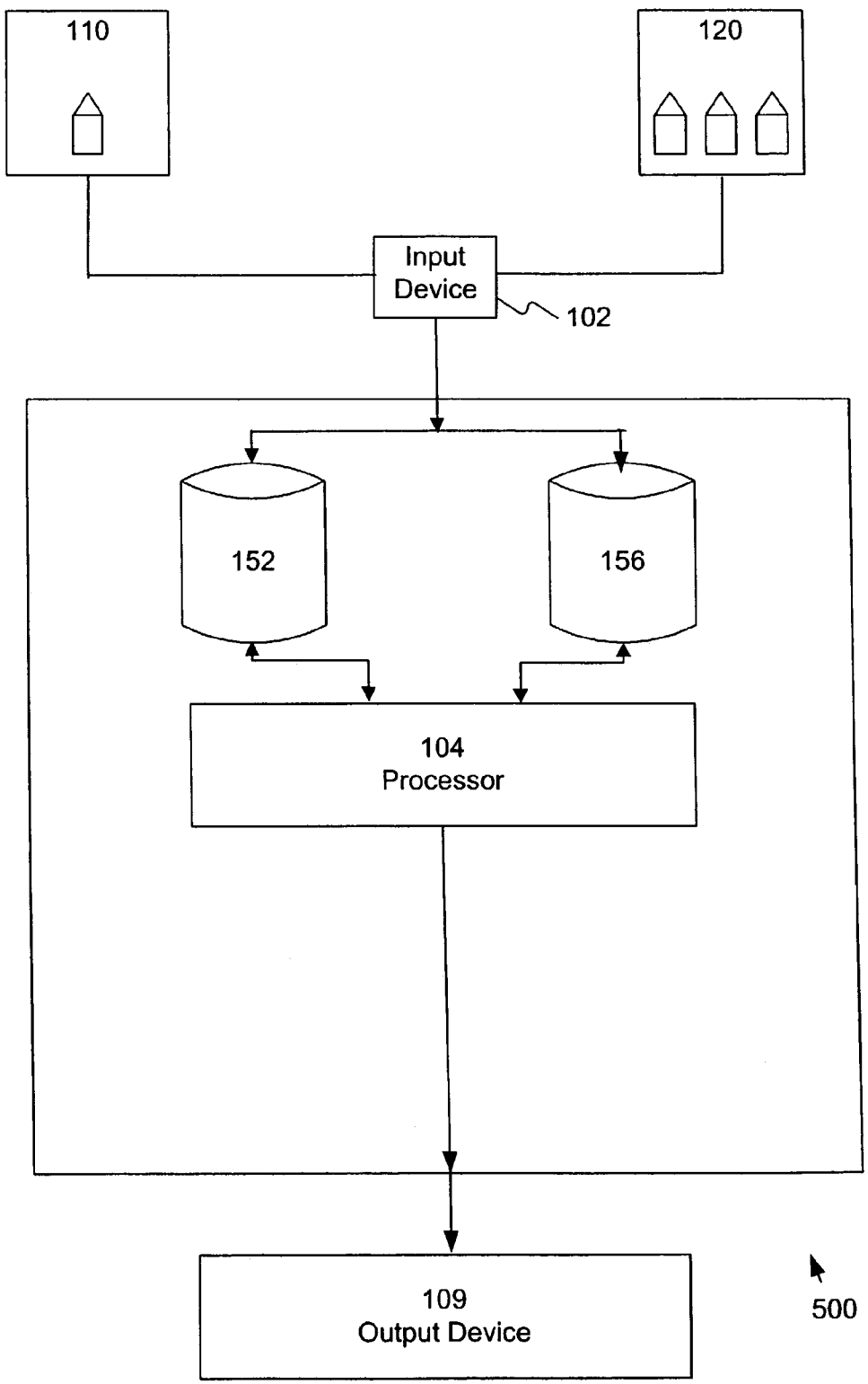
FIG. 5 illustrates another exemplary system environment, consistent with an embodiment of the present invention.

FIG. 5 illustrates another exemplary system environment, consistent with an embodiment of the present invention. As shown in FIG. 5, a system environment 500 is provided that includes components similar to those illustrated in FIG. 1. Specifically, system environment 500 includes input device 102, processor 104 and output device 109. System environment 500 may also include a program storage with software programs and a RAM (not shown). Information about subject asset 110, and a set of asset 120 may be received by input device 102 and stored in one or more databases (such as databases 152 and 156). With system environment 500, the risk and ultimately, the value associated with a subject asset 110 or a pool of assets may be determined. Processor 104 of system 500 compares information about subject asset 110 stored in a database 152 to information about the set of assets 120 stored in database 156. For example, information about subject asset 110 can be compared to information about a set of comparable assets and also to information about the set of assets sold in the past. Information is output to output device 109.

Figure 6:
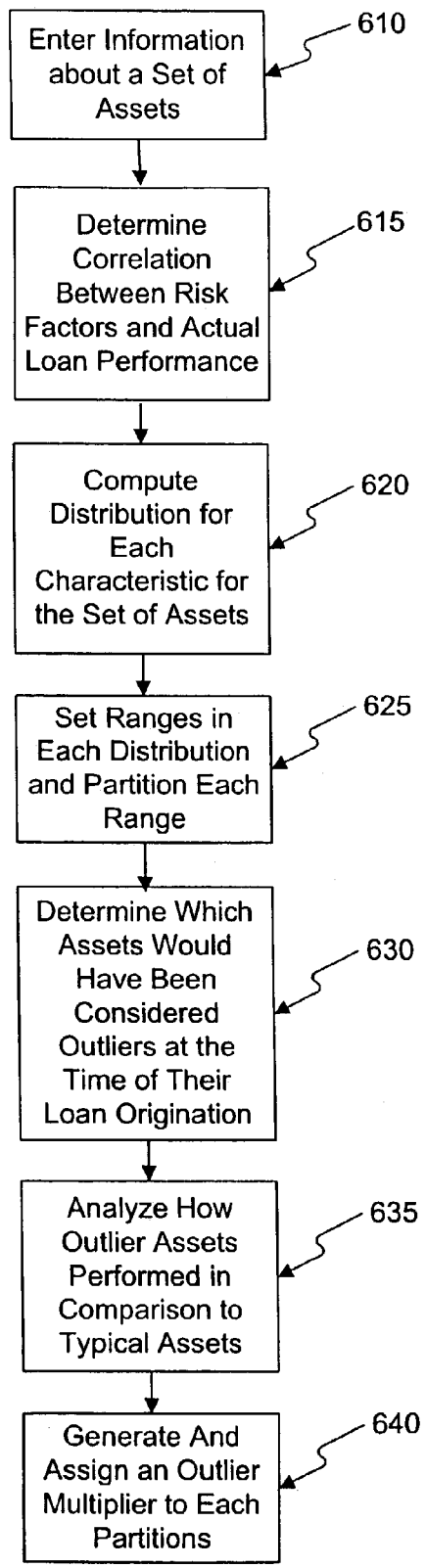
FIG. 6 illustrates an exemplary flow chart for analyzing assets sold in the past.

FIG. 6 illustrates an exemplary flow chart for analyzing a set of assets using, for example, system environment 500 of FIG. 5. As shown in FIG. 6, information about the set of assets may be entered into input device 102 (step 610). As part of this step, system 500 may first analyze the performance of loans secured by the set of assets without considering characteristics as outliers. By way of a non-limiting example, the system may analyze factors existing at the time the loans were originated and throughout the life of each loan. Factors may include common factors and characteristics, such as the square feet of the building, number of rooms, number of bathrooms, age, lot size, pool, driveway, percent appreciation within one year, and tax assessment. Some factors and characteristics may not normally be thought to affect the risk and/or value associated with an asset. System 500 then analyzes the actual performance of the loans, including loan defaults, prepayments and severity for loans and determines the correlation between the factors and actual loan performance (step 615).

System 500 further analyzes the set of assets to determine which would have been identified as outliers at the time of loan origination. Specifically, system 500 may compute a distribution for each characteristic and/or correlation between multiple characteristics of a predetermined set of characteristics (step 620). A range is set within each distribution within which a characteristic and/or correlation is considered an outlier as compared to characteristics that fall closer to the center of the distribution (step 625). Assets falling outside this range, i.e., closer to the center of the distribution, may be considered typical assets. In this manner, system 500 can identify which assets would have been identified as atypical at the time of origination, during the life of, or after the termination of the loan (step 630). Similarly, system 500 can compute a distribution for each characteristic of a predetermined set of characteristics for comparable assets and determine which comparable assets would have been considered atypical at the time of their loan origination.

Figure 7A:
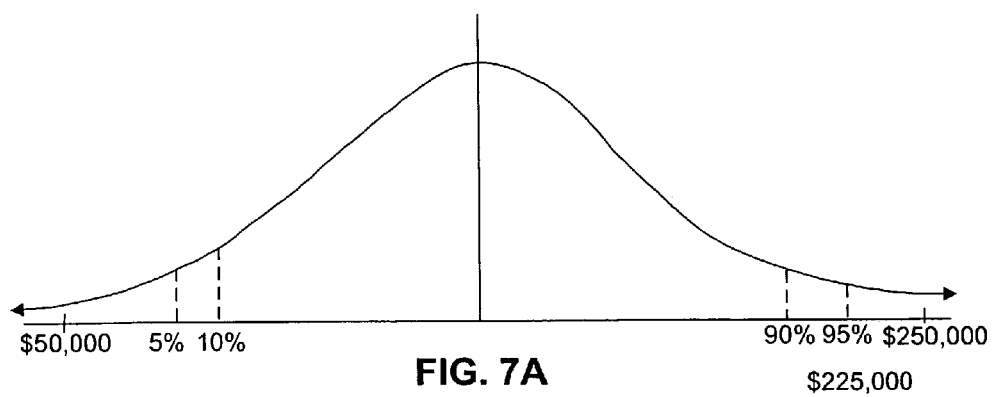
FIGS. 7A and 7B illustrate exemplary bell curve statistical distributions for the sales prices and square feet for a building for a group of residential assets.
Figure 7B:
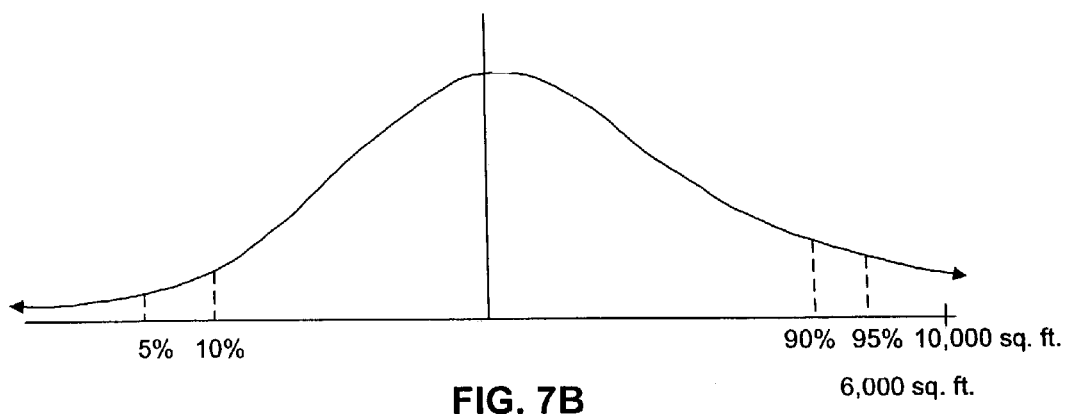

An example of how embodiments of the invention can use distributions to determine outliers, two characteristics, property value and square footage of the building, may be chosen as exemplary indicia of typicality/atypicality. FIGS. 7A and 7B illustrate exemplary distributions according to property value and square footage of the building, respectively. In the example of FIG. 7A, 95% of all homes in a population of homes have property values less than $225,000, and in FIG. 7B 95% of the homes in the population have less than 6,000 sq. ft. With these exemplary distributions, a $1,000,000 home or a home with 50,000 sq. ft. would be an outlier because it would have a characteristic exceeding the ranges set in the distributions. These homes would be atypical in as compared to other homes in the population and may present serious marketability problems. Although an asset may be valued at $1,000,000, it may be difficult to attract a purchaser willing to buy the atypical property.

As mentioned, the neighborhood (i.e., population) in which an asset is located may impact the effect that a characteristic or correlation between multiple characteristics has on the risk, and ultimately the value, of the asset. As such, an asset having a characteristic in a neighborhood where most properties do not have that characteristic may be overvalued or undervalued. For example, a 10,000 sq. ft. house may be worth more in a neighborhood where all the other houses are about 10,000 sq. ft. than would a 10,000 sq. ft. house in a neighborhood where all the other houses are 3,000 sq. ft. This is because the value of the property is itself a function of not only its own characteristics, but also the characteristics of its neighboring properties.

In certain embodiments, the tails of the distributions (e.g., 1%/99%, 5%/95%, and 10%/90% ranges) are used to denote ranges of outlier characteristics. However, these numbers are exemplary and other ranges are envisioned. Assets having characteristics in these tails are considered atypical. For example, FIG. 7A illustrates a bell curve distribution of the characteristic "tax assessed property value" for a group of homes. In this example, 95% of the homes in the population have a tax assessed property value of less than $225,000. A home with a tax assessed property value of $250,000 falls in the tail of the distribution and would be considered atypical. This asset may be flagged or identified as an atypical because it has an outlier tax assessed property value. Similarly, as shown in the example of FIG. 7B, if 95% of the homes in the population have less than 6,000 square feet, then a 10,000 square foot home may also be flagged as atypical.

Consistent with embodiments of the present invention, characteristics that are outliers on the other tail end of the distribution may also be flagged. For example, a home with a tax assessed property value of $50,000 would be labeled atypical by the system shown in FIG. 7A, because the $50,000 home would fall in lower end tail of the distribution. There are many reasons for the asset to have a lower value than other assets in the population. For instance, the home may be smaller than neighboring homes, it may be older, or it may be adjacent to, or located on, an environmental problem, or some other type of nuisance.

Referring again to FIG. 6, after analyzing the performance of the set of assets and identifying atypical assets, system 500 may analyze how the atypical assets performed in comparison to typical assets (step 635). For example, using numerical or statistical methods, such as logistic regressions, the system examines whether the atypical assets from the set of assets had a different incidence of default than would have been predicted by analyzing typical assets. Software tools for performing linear or logistic regressions are known and commercially available from for example, SAS Institute Inc. For example, a loan with a LTV ratio of 95 and a credit score of 600 may typically have a default rate of 1%. However, if the asset associated with this loan is atypical, the loan may exhibit a default rate of 1.5%. Similarly, for those assets securing loans that did default, system 500 may analyze whether the defaulted loans on atypical assets had a greater severity than would have been predicted for more typical assets. The differences in default rate and severity as compared to predicted values is often due to problems with marketability.

Subsequently, as shown at step 640, a set of characteristics is selected. In certain embodiments the characteristics are chosen based on their usefulness as predictive indicia of risk. With these characteristics, systems consistent with the present invention can generate a quantitative measure of risk associated with each partition in the distributions (herein referred to as a multiplier). The multiplier can be generated using statistical methods well known to one of ordinary skill in the art. Analyzing different combinations of the characteristics can yield different multipliers. While there are many different multipliers, two exemplary multipliers, a risk multiplier and a severity multiplier, will be described.

Risk multipliers are comparative measures used to forecast the probability of default of a loan on a subject asset. The probability of default of the subject asset may be gauged against historical default rates of a set of assets. For example, a risk multiplier of 1.5 would indicate that a mortgage will default at 150% of the expected default rate of a loan with typical risk factors.

Risk multipliers can also be used as comparative measures to forecast the probability of prepayment of a loan on a subject asset. The probability of prepayment of the subject asset may be gauged against historical default rates for a set of assets. For example, a risk multiplier of 0.75 would indicate that a mortgage will default at 75% of the expected prepayment rate of a loan with typical risk factors.

Severity multipliers are comparative measures used to forecast the expected loss per dollar outstanding for assets that default. The severity multiplier is a gauge of expected severity of an asset if it were to default as compared to historical severity rates of the set of assets. For example, a severity multiplier of 1.3 would indicate that the loss per dollar outstanding at the time of default would be 130% of the historical severity.

In certain embodiments of the present invention, at least two multipliers can be combined to form a single, overall multiplier. The overall multiplier can be a single numerical expression that quantifies the expected risk associated with an expected cash flow.

When considering the purchase of a pool of loans comprising atypical properties, the offering price for the pool can be adjusted based on the multiplier or the overall multiplier. For example, if the risk multiplier associated with a pool of loans is 2.0 and the severity multiplier associated with these loans is 1.5, then the offering price for the pool of loans may be adjusted based on lower value of the pool, in this case about 300%. In this example, the adjustment arising from the following: (2.0)*(1.5) 3.0, or 300%.

To generate the multipliers, a comparison is made using one or more characteristics. The characteristics are generally common to all assets. For example, if the assets to be valued are improved real estate, a characteristic can be, for example, square footage of the building, square footage of the lot on which the building sits, number of rooms, sales price, age, or property tax assessment. In this illustration, six exemplary characteristics are described, however, it is contemplated that there can be numerous characteristics. For ease of discussion, a characteristic may be referred to in terms of "a selected characteristic" or "$SC_i$", such as $SC_1$, $SC_2$, $SC_3$, ..., $SC_n$, where i=1, 2, 3, ..., n.

After selecting a set of characteristics, the distributions computed for each of the characteristics of the set of assets are retrieved. The distributions provide a reference for each $SC_i$ to which each corresponding subject asset $SC_i$ can be compared. At times, the distributions may form a bell curve distribution. However, other distribution functions are possible.

To form the distributions for example, where there are n $SC_i$s, where i=1, 2, 3, ..., n, processor 104 may search for all $SC_1$s in the information about each asset in the set of assets stored in database 152. Processor 104 creates and stores list of the $SC_1$s in database 156. Similarly, processor 104 searches for all $SC_2$s in the information about each asset in the set of assets stored in database 152 and creates and stores in database 156 a separate list of all $SC_2$s. This operation continues until all n SCs have been searched, grouped, and listed. Processor 104 then conducts a statistical analysis on each list to generate a distribution for each $SC_i$. The result of the statistical analyses are "n" distributions stored in database 156, with a distribution computed for each $SC_i$.

There are a number of ways to determine the outlier designation. For example, based on the level of granularity desired in the analysis a percentile range is set in a distribution. For example, the system can set a lower percentile limit of 5% and an upper percentile limit of 95%, i.e., these percentiles mark the tails of the distributions. With this range selected, any characteristic whose values are less than the lowest 5% of the comparable characteristics, or greater than 95% of the comparable characteristics, will be considered outliers. Outliers in a multi-dimensional basis can for example, be made by determining the multidimensional correlations among the characteristics. An embodiment of the present invention measures of the degree of atypicality based on implied probability density contours.

Figure 8A:
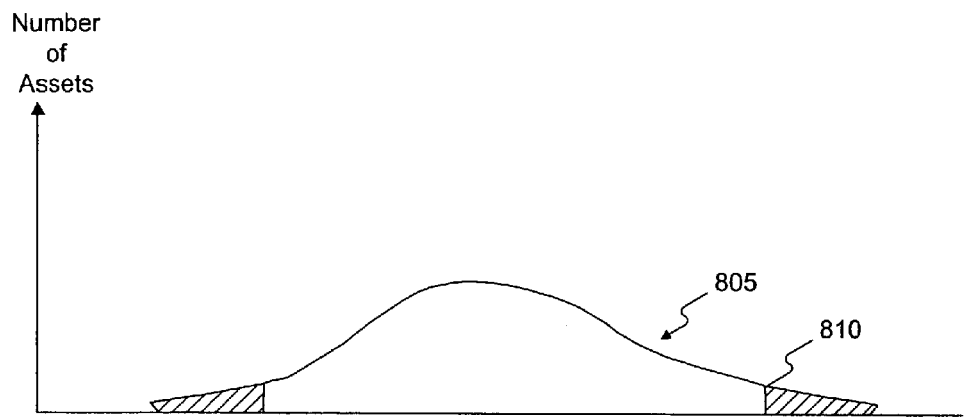
FIGS. 8A and 8B illustrate exemplary ranges and partitions in a statistical distribution.

Each $SC_i$ may have a different range in its corresponding distribution within which a characteristic is determined to be an outlier. For example, FIG. 8A shows an exemplary distribution 805 for $SC_i$. In FIG. 8A, subject assets having a characteristic falling at or within 810 may be considered atypical. In an embodiment of the present invention, the risk associated with a characteristic falling on each partition in the respective distribution is determined and assigned a multiplier. Each partition is assigned the multiplier that quantifies the risk. Thus, such systems may quantify the risk associated with each partition of an asset being an outlier.

Figure 8B:
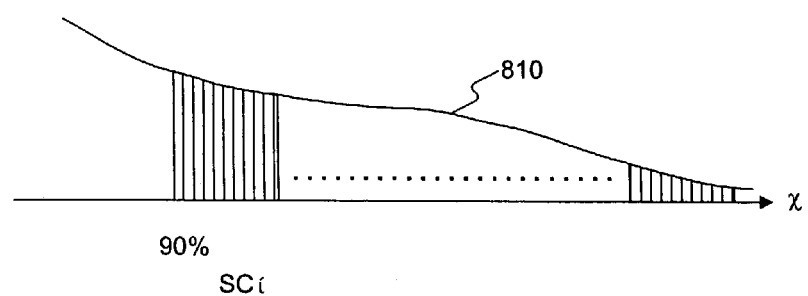

FIG. 8B illustrates an expanded view of a range 810 for an exemplary distribution. In the example of FIG. 8B, a $SC_i$ exceeding the $90^{th}$ percentile may be considered an outlier and its corresponding asset flagged as atypical. This range can be adjusted according to the level of granularity required. As illustrated in FIG. 8B, outlier region 810 can be partitioned in the x direction to denote various levels of granularity. Partitions can be discrete or continuous.

As an illustrative example, processor 104 may determine through conventional statistical analyses that historically, a $SC_i$ falling in the $97.2^{th}$ percentile (corresponding to a partition value at 97.2) have a risk multiplier of 1.4. As another example, a $SC_i$ falling in the $98^{th}$ percentile (corresponding to a partition value at 98) may be found to have a risk multiplier of 1.43.

To calculate multipliers, processor 104 may retrieve information for each $SC_i$ for the asset that would have been considered atypical at the time of sale from the set of assets. For example, default rates for loans secured by the set of assets are retrieved and processor 104 may conduct a statistical analysis to determine the correlation between a $SC_i$ and default rates. The system may show that some outlier characteristics have a stronger correlation with default than others or that a particular characteristic may strongly correlate with other characteristics to affect default. Using conventional statistical methods, the system can then generate a risk multiplier based on the correlation between a characteristic and an asset's default risk.

Different types of correlations can be computed, including a correlation coefficient, the Pearson's product moment correlation coefficient, the Spearman rank correlation coefficient, a paired sample T-test, a least squares method, a simple linear regression, a multiple regression, a nonlinear regression, or a multiple regression correlation coefficient. A correlation coefficient typically is a measure that shows the degree to which two variables are related. For example, when two variables have a perfect linear relationship with a positive slope, then when one variable is high (i.e., $SC_i$ is atypical), the other value is also high (i.e., there is a high probability that a loan made to finance the asset will default). In contrast, there is a negative correlation coefficient when one variable is high when the other variable is low.

As an illustrative example, suppose that in the past, loans on assets determined to be atypical because they are outliers in the square footage of the building, default at a greater rate than assets within a normal range in terms of the square footage of the building. In this case, the correlation coefficient may be a large positive number. On the other hand, assets determined to be atypical because they are outliers in their age may not have as strong a correlation with loan default, and the correlation coefficient may be a small positive number.

In a multivariate approach used in multi-dimensional basis, the calculation of which is well known to one of ordinary skill in the art, can be used to determine how different characteristics interact with each other. For instance, it may be that a large building does not cause the property to be atypical when the lot on which the building is located is also large. However, a property may be found to be atypical if the building on it is smaller than the typical building in the area, and the lot is larger than the typical lot in the area. Further, in certain embodiments of the present invention, non-parametric regression techniques can be used to determine the interaction of the characteristics. Non-parametric regressions allow a functional relationship between variables to be established.

Figure 9:
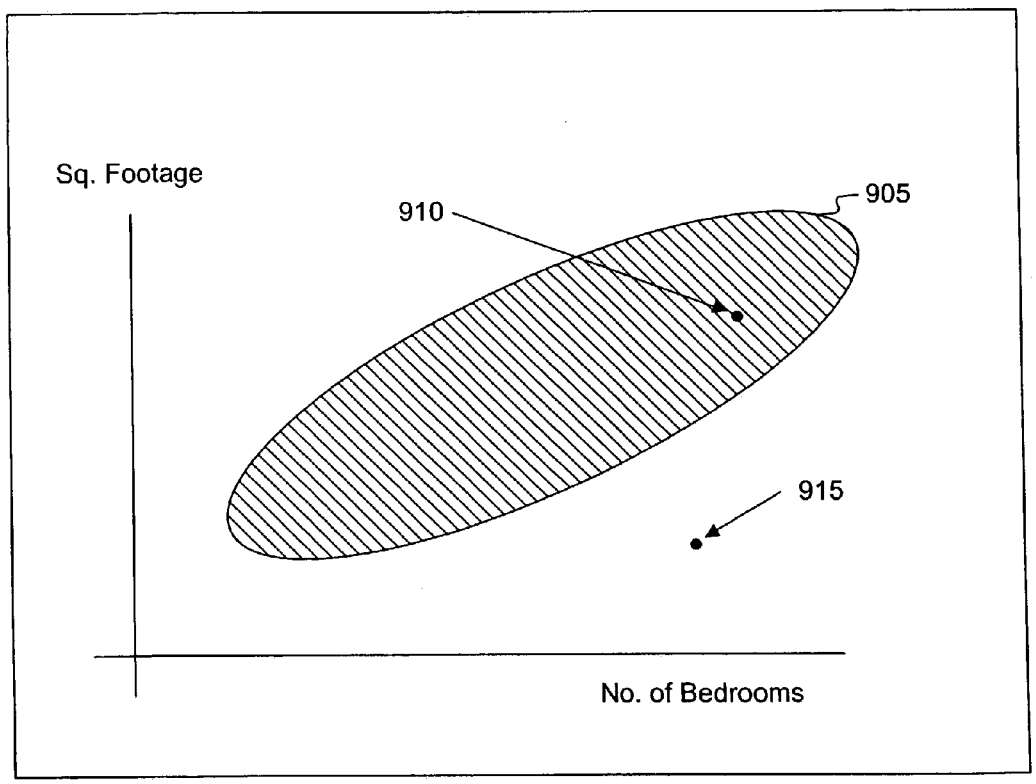
FIG. 9 illustrates exemplary contour lines in a two dimensional space, where one dimension represents the square footage of a group of residential real estate assets and the other dimension represents the number of bedrooms for assets in a group of residential real estates assets.

In accordance with other embodiments of the present invention, multivariate measures of atypicality are used. As an illustrative example, FIG. 9 shows that square footage of the building and number of bedrooms are positively correlated because homes with higher square footage also have higher numbers of bedrooms. In this case, assets having values close to the center of the distribution 905 are not atypical. However, assets falling in the tails of the distribution 905 are flagged as atypical. For example, a five bedroom home may not be atypical in a particular neighborhood shown at 910. Similarly, many areas exist where most homes have 1100 square feet. However, a 1100 square foot home with five bedrooms may be atypical, shown at 915.

Multivariate measures typically estimate a variance/covariance matrix of characteristics. The characteristics values are differenced from other measures of central tendency, such as the mean or median, and the resulting deviations are weighted by the inverse of the covariance matrix. In this manner, a z-score version of a multivariate measure can be computed. As an illustrative example, the mean value can be subtracted from a particular characteristic value and then the result divided by the standard deviation. In addition, when multiple characteristics are used, each $SC_i$ can be weighted equally or some $SC_i$ may be weighted differently depending on the degree to which they influence risk and value.

Processor 104 may use conventional statistical analyses to calculate a multiplier for each partition in the distribution, and more particularly, for each partition in the outlier range. Processor 104 then assigns the multiplier to each partition in the distribution, and more particularly, to each partition in the outlier range for each $SC_i$ for each distribution.

After computing the multipliers for each $SC_i$, system 100 can analyze the subject asset. As an illustrative example, data about subject asset 110 is supplied to processor 104 and a group of characteristics are selected and analyzed. In some instances, the subject asset 110 and the set of assets 120 may have none, some, or all of the characteristics. Processor 104 may search databases 152 and 156, and create a list of "k" characteristics for each subject asset 110, where k≧1, and an array of "j" characteristics for the set of asset 120 where j≧1. At least one selected characteristic $SC_k$ from list 152 may correspond to at least one $SC_j$ from an array in database 156. Often k=j, however, "k" need not equal "j".

As an illustrative example, three characteristics may have been selected; square footage of the lot, tax assessed value, and age of the property. However, information about only two characteristics may be available for a particular subject asset 110; square footage of the lot and tax assessed value. On the other hand, information about all three characteristics may be available for the set of assets 120. In this example, the square footage of the lot for the particular subject asset 110 can be compared to the square footage of the lot for the set of assets 120. Similarly, tax assessed value for the particular subject asset 110 can be compared to tax assessed value for the set of assets 120. However, because information about the property age of the particular subject asset 110 is not available, it is not used as a comparative measure.

Processor 104 may compare each characteristic of the subject asset to the corresponding characteristic distribution for the set of assets. If an $SC_j$ of the subject asset is determined to be in the outlier range, then the subject asset is flagged as atypical and assigned the multiplier corresponding to the partition on which the characteristic falls. This is repeated until all $SC_j$ have been analyzed, and all outlier characteristics have been identified and assigned multipliers.

In one embodiment, processor 104 can use a model-based approach to compare each of the "j" SC of the subject asset to the corresponding statistical distribution computed for each of the characteristics. Generally, a model-based approach allows a user to analyze a subject asset by comparing it with information about a group of assets that are similar (or dissimilar) in some way to the subject asset. In certain embodiments, after all characteristics have been analyzed and the outlier characteristics assigned multipliers, processor 104 can compute an overall multiplier for the subject asset which is fed to output device 106.

Figure 10:
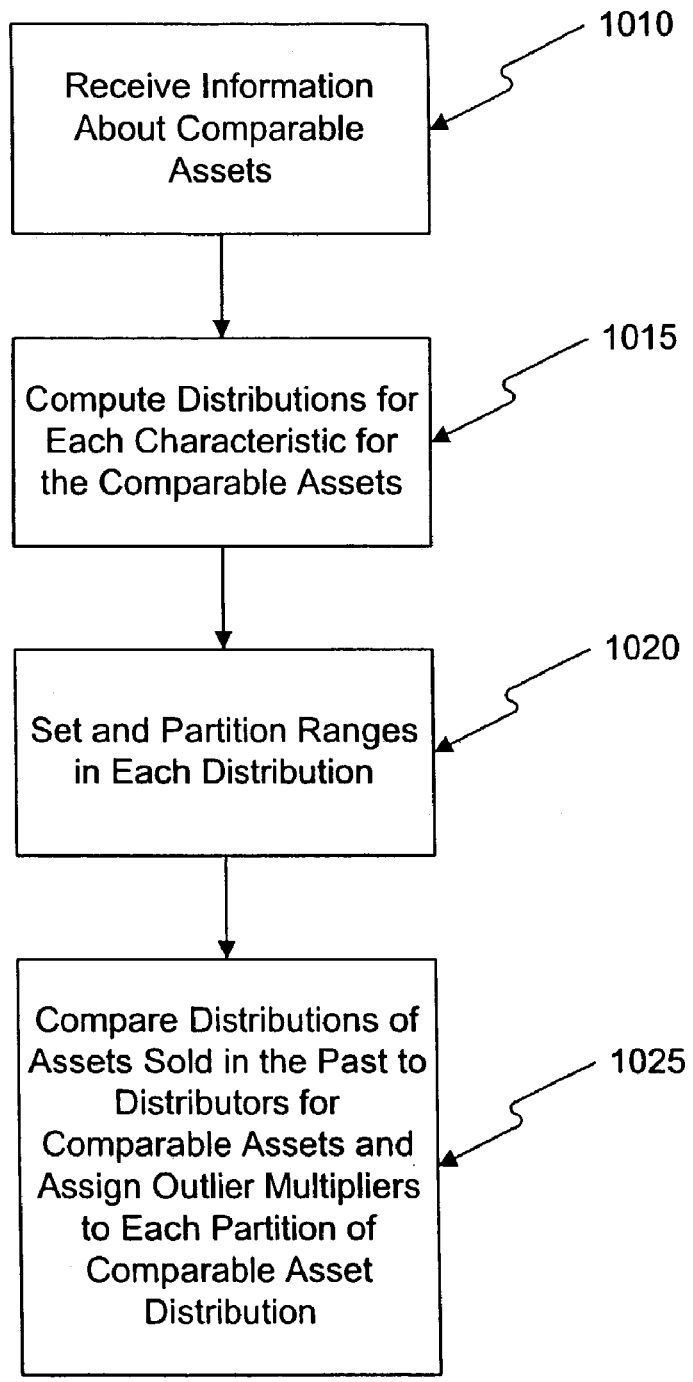
FIG. 10 illustrates an exemplary flow chart for analyzing comparable assets.

FIG. 10 illustrates an exemplary flow chart of an embodiment of the present invention where a comparison is made between each partition for each distribution of the assets sold in the past and the distributions formed for the corresponding characteristics for comparable assets. In this embodiment, multipliers can be assigned to each partition in each distribution for the comparable assets. Specifically, at step 1010, information about comparable assets is received by input device 102. At step 1015, processor 104 computes distributions for each characteristic for the comparable assets. At step 1020, processor 104 sets the range in the distributions within which a characteristic is flagged as an outlier and partitions each range. At step 1025, processor 104 then compares the distributions of the assets sold in the past to the distributions for the comparable assets and assigns multipliers to each partition in the comparable assets distributions using conventional statistical methods.

Figure 11:
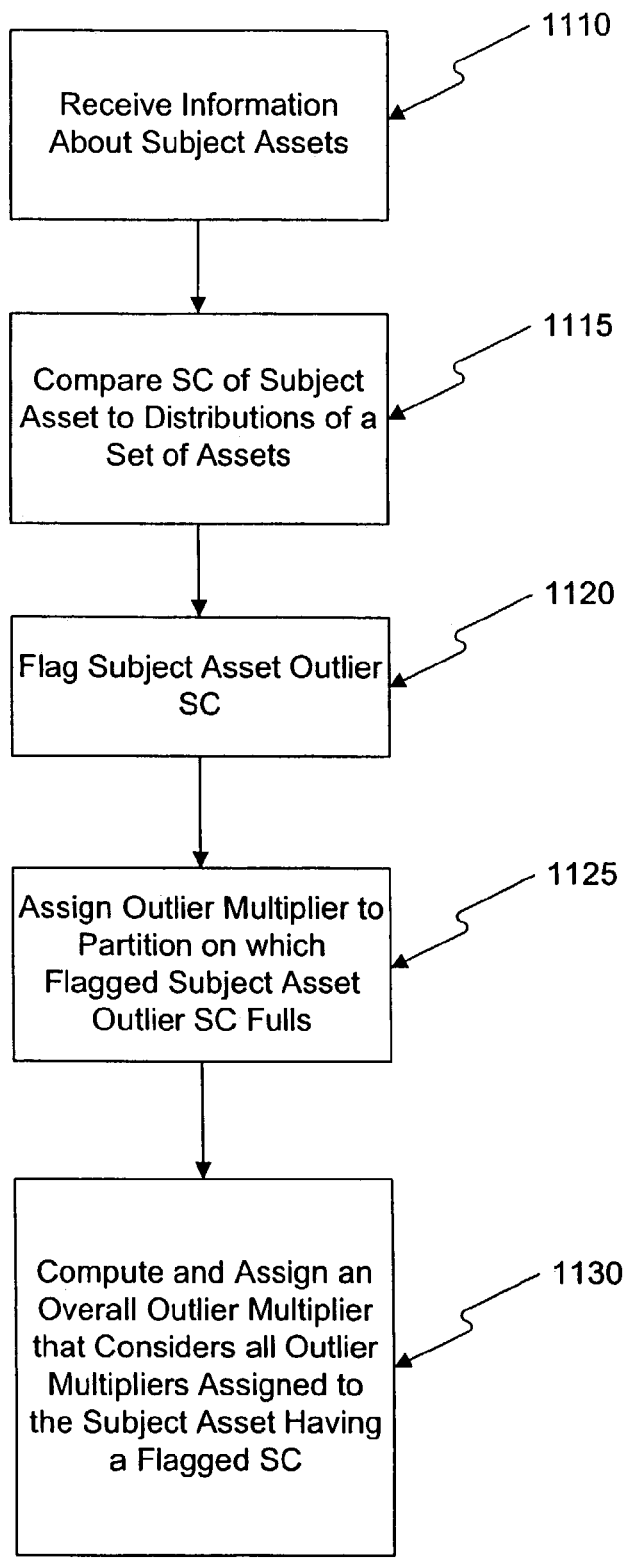
FIG. 11 illustrates an exemplary flow chart for analyzing a subject asset.

FIG. 11 shows an exemplary flow chart depicting the assignment of an overall multiplier to each subject asset having SC flagged as outliers. At step 1110, input device 102 receives information about subject asset 110. At step 1115, processor 104 compares each SC of subject asset 110 to the corresponding distributions for the set of assets 120. At step 1120, processor 104 flags subject assets as atypical because they have outlier SCs. Step 1125 shows that processor 104 assigns a multiplier corresponding to the partition on which the characteristic falls. At step 1130, processor 104 computes and assigns an overall multiplier that considers all multipliers assigned to the subject asset having been flagged for having outlier SCs.

Consistent with embodiments of the invention, the multipliers can be used to justify financial decisions about the atypical subject asset. For example, the risk multiplier can aid a purchaser when deciding whether to buy the subject asset. The purchaser can compare the risk multiplier for the subject asset with those of other assets. If the subject asset's risk multiplier is unfavorable, the purchaser may decide to forego the purchase. Alternatively, a lender can consider the risk and severity multipliers when deciding whether to originate a loan secured by an atypical subject asset. Along this same line, the lender can use the risk factor to adjust the interest rate charged on a loan secured by a subject asset to accurately account for the increased risk from decreased marketability of an atypical asset. Alternatively, a financial institution can use the multipliers in making decisions about purchasing a pool of loans. In this case, the financial institution may adjust the guarantee fee based on the degree of risk reflected in the multipliers.

In accordance with an embodiment of the invention, selected characteristic values for each asset can form vectors, which are well known to one of ordinary skill in the art, that can be used to compute risk and value. Vectors can be combined with the assets dollar value and can be used to compute an accurate valuation for an asset. Alternatively, the atypical designation can be used directly in default and severity models to assess the incremental risk associated with an asset. Thus, by developing models of atypicality of assets the system can forecast the marketability of atypical assets.

In accordance with an embodiment of the present invention, the disclosed systems and methods can be used to help a lender decide whether to foreclose on a defaulted loan. In this case, an owner of an asset anticipated to have marketability problems may be offered a temporary forbearance. This may reduce the default rate for the lender and stabilize the owner's position as well.

In addition, systems and methods consistent with embodiments of the present invention can be used to set an accurate price when an asset is put up for sale or refinanced.

In accordance with another embodiment of the present invention, the disclosed systems and methods can aid lenders in risk management when accounting for different types of markets (i.e., up markets or down markets). For instance, in normal market environments, atypical properties may appreciate in ways that appear similar to typical properties. They may also appreciate in ways that appear similar to typical properties in strong markets. However, in down markets, atypical properties can act significantly different than typical properties.

Understanding how atypical properties respond to different markets can aid in risk management by calculating the risk associated with marketability. To accomplish this, in an embodiment of the invention, processor 104 may look at homes that have undergone multiple sales. First, the appropriate neighborhood is chosen. For example, the neighborhood may be defined as 100 homes that sold in Bethesda, Md., in 1985. Of those 100 homes, processor 104 may classify three as atypical and determine that they may have marketability problems. The classification may result from one home being completely circular, one being a log cabin, and one having 1000 square feet of living space with a 3000 square foot garage. Looking at the historical data, processor 104 may find that typical properties appreciated from 1985 to 1990 with an average appreciation of 15%, even though 1990 was a bad real estate market as it was the start of a recession. However, instead of having a 15% increase in value, atypical properties may be found to have suffered a 20% decline in value. In addition to declining property values, the atypical properties may take longer to sell. In this example, the average time before sale of an atypical property may be three times longer than a typical property.

A financial institution lending money secured by an atypical property is subject to increased risk if the value of the property falls. If the property is resold in a foreclosure, the financial institution typically receives only partial compensation for the money lent. Therefore, the risk in a down market is especially bad for atypical properties because there is a greater likelihood of default, and there is also a risk of not being able to recoup the money lent for the property. As can be understood, atypical properties are especially likely to default in a bad environment. By using historical data about homes that have gone though multiple transactions when determining risk, processor 104 can more accurately identify atypical properties. With this information, users can manage their risk exposure.

In addition, a financial institution can use the computed risk associated with different markets to gauge the insurance fees needed for a particular atypical property. Insurance fees include the premium that a financial institution will charge on a loan to take on the default risk for the particular loan. For an atypical property, this premium can be greater than for a typical loan, as the default risk for an atypical property is higher. In determining the insurance fee required, financial institutions attempt to predict the price or market value of a property in the future, for example, 30 years hence. Typical properties may appreciate at a relatively predictable rate with only minor fluctuations, with the fluctuations being considered the spread. However, as mentioned, atypical properties may appreciate like typical properties in normal and strong markets while their values may change quite differently in down markets. How the atypical properties are affected by market conditions may not be apparent from simply looking at a property, as would be done by an appraiser. However, using systems and methods consistent with embodiments of the present invention, the spread for atypical properties can be computed.

In addition to determining marketability, systems and methods consistent with embodiments of the present invention can save time and money in conducting valuations by not requiring an appraiser to personally visit the subject asset to determine its value. For example, processor 104 can provide a validation of one of the assumptions needed for a collateral model to provide a reasonable approximation of what the subject asset should sell for. Processor 104 may use the multipliers to determine the probable sales price.

As mentioned, processor 104 can also be used at the aggregate level when evaluating a pool of loans. At this level, the business decision is whether a particular pool of loans has an unacceptable degree of risk. To resolve this question, marketability of the assets securing individual loans can be investigated. Systems and methods consistent with embodiments of the present invention can determine the number or percent of atypical loans in the particular pool. If the pool has a number or percentage greater than a predetermined level, the pool is flagged as being risky and assigned an multiplier. Alternatively, if the risk and/or severity multiplier determined for the pool is greater than a predetermined level, the pool can be flagged for reevaluation. This can be particularly useful when a financial institution is determining whether to purchase a pool of loans. Using systems and methods consistent with embodiments of the present invention, the financial institution can easily evaluate a plurality of properties held in the pool.

Sometimes pools of loans are purchased by investors. However, investors will not purchase a pool if the return is inadequate in light of the risk. As atypical loans in the pool affect the overall risk associated with the pool, an investor can use embodiments of the present invention to identify atypical loans within a pool. With this information, the investor can negotiate with the seller so as to eliminate atypical loans from the pool, thereby lowering the risk associated with the pool to a level acceptable to the investor. On the other hand, an investor may negotiate the right to return loans from a pool already purchased that are later determined to be atypical. Alternatively, an investor in a pool of loans can reinsure loans on atypical assets to reduce the overall risk associated with the pool.

Alternatively, embodiments of the present invention can assist in the evaluation of pools having large numbers of loans where it would be virtually impossible for appraisers to evaluate all the assets in the pool. In some instances, investors have only a few days to decide whether to purchase a pool. If the pool contains, for example, 10,000 loans, then 10,000 appraisals would be needed for an accurate evaluation of the pool. Since an appraisal currently costs about $200, it would be prohibitively expensive to evaluate this exemplary pool alone. In addition, that number of appraisals most likely could not be conducted and coordinated in the span of a few days. Embodiments of the present invention, however, allow an evaluation to be done in a brief period of time. Additionally, potentially higher risk loans can be flagged for higher scrutiny.

Currently in the market, some lenders use a streamlined process when making loans. In order to save time and expense in the lending process, the lenders make loan decisions based on minimal criteria. Often, these lenders look at a purchaser's credit history or financial position to determine whether to make a loan and do not investigate the asset securing the loan. Under such circumstances, lenders may make loans secured by atypical assets that have poor marketability. As the lenders make more loans, they begin to amass pools of loans secured by an unacceptable number of atypical assets. An investor wishing to purchase one of these pools may assume an unwanted degree of risk. However, using the disclosed embodiments of the present invention, investors can determine an accurate assessment of risk.

Further, collateral forecasts and related data can be used to build an automated tool for determining rates of atypicality. A lender that attempts to misuse a streamlined collateral process by submitting loans secured by atypical assets for sale into the secondary market could be detected by the disclosed embodiments of the present invention.

As mentioned, many characteristics can be used to measure atypicality. However, it is possible that these measures may be imperfect indicators of atypical assets and could lead to a false positive rate. To account for this type of imperfection, a lender's baseline data may be used to create baseline rates for these measures. Using this type of technique, effective thresholds are set such that the likelihood and corresponding risk to the streamlined process should fall within acceptable ranges.

In addition, systems and methods consistent with embodiments of the present invention may be used in managing loans that are likely to go into default. For example, the system can serve as an additional factor to consider in the risk analysis of possible default loans. An atypical asset can be treated differently than a typical asset. For example, in some situations, assets with marketability problems may take longer to sell, and as a result, a steeper discount may be applied to the sale price of the foreclosed asset.

Measures are useful beyond knowing the risk associated with a single loan. By combining loans with different risks, the asset level marketability indicators can be used to assist in the understanding and management of the pool level risks.

Other embodiments of the invention will be apparent to those skilled in the art from consideration of the specification and practice of the embodiments of the invention disclosed herein. It is intended that the specification and examples be considered as exemplary only, with a true scope and spirit of the invention being indicated by the claims herein.

What is claimed is:

1. A method of analyzing an asset using a processor comprising:
    (a) using a computer to compute a distribution for a characteristic of a set of assets;
    (b) setting a range defining an outlier in the distribution;
    (c) partitioning the range into at least one partition;
    (d) assigning to each partition a multiplier representing how the characteristic affects a risk associated with an asset, wherein the risk associated with the asset is selected from the group consisting of default risk, severity, and prepayment;
    (e) determining whether a characteristic of a subject asset falls within the range set within the distribution for the corresponding characteristic;
    (f) assigning the multiplier corresponding to the partition on which the characteristic of the subject asset falls; and
    (g) outputting the multiplier to a user for use in making a business decision.

2. A method of analyzing an asset using a processor according to claim 1, wherein there are at least two characteristics, the method further comprising:
    (h) repeating steps (a)-(d) for each characteristic; and
    (i) generating a correlation between each of the multipliers for each characteristic to form an overall multiplier.

3. A method of analyzing an asset using a processor according to claim 2, further comprising:
    determining whether a characteristic of a subject asset falls within the range set within the distribution for each of the corresponding characteristics; and
    assigning the multiplier corresponding to the partition on which each of the characteristics of the subject asset fall for those characteristics of the subject asset falling in the range set in the distribution corresponding to the characteristic.

4. A method of analyzing an asset using a processor according to claim 1, wherein the characteristic is not correlated with the risk associated with an asset.

5. A method of analyzing an asset using a processor according to claim 2, wherein at least one characteristic is not correlated with the risk associated with an asset.

6. A method of analyzing an asset, wherein the asset is one asset in a set of assets, using a processor comprising:
    (a) determining a correlation between at least two characteristics of an asset and a risk associated with the asset, wherein at least one of the two characteristics is an outlier;
    (b) using a computer to assign a multiplier to the correlation, wherein the multiplier is used in a risk analysis;
    (c) repeating step (a) for each asset in the set of assets;
    (d) combining each corresponding correlation of step (c) to form a set for each correlation;
    (e) generating a distribution for each set;
    (f) correlating the risk associated with an asset to each position in the distribution;
    (g) setting a range defining an outlier in each distribution;
    (h) partitioning each range into at least one partition;
    (i) determining the risk associated with an asset based on the partition on which correlations of an asset falls;

(j) assigning a multiplier to each partition; and (k) outputting the multiplier to a user for use in making a business decision.

7. A method of analyzing an asset using a processor according to claim 6, further comprising:

determining whether the correlation between at least two characteristics of a subject asset falls within the range set within the distribution for the corresponding correlation;

assigning the multiplier corresponding to the partition on which the correlation between the at least two characteristics of the subject asset fall for those assets in the set of assets having correlations falling in the range; and computing a risk analysis of the subject asset using the multiplier.

8. A method of analyzing an asset using a processor according to claim 7, wherein the risk associated with the asset is selected from the group consisting of default risk, severity, and prepayment.

9. A method of analyzing assets using a processor, the method comprising the steps of:

receiving information about a set of assets, wherein the information about the set of assets comprises a financial history for a loan secured by each asset in the set of assets, the financial history including information about actual performance of the loan, and wherein each asset in the set of assets has at least one characteristic capable of being quantified;

determining a correlation between a risk factor and the actual performance of each loan;

using a computer to compute a statistical distribution for each characteristic;

setting a range defining an outlier in each statistical distribution;

partitioning the range into at least one partition;

determining which of the assets in the set of assets sold in the past contain characteristics that fall in the range set in each of the corresponding statistical distributions, and for those assets falling in the range, determining the partition on which the corresponding characteristic falls;

comparing the actual loan performance for the assets having characteristics that fall in the range set in each of the corresponding statistical distributions to the actual loan performance for the assets whose characteristics fall outside the range;

generating a correlation between the level of each partition and actual loan performance;

assigning a multiplier to each partition based on the generated correlation; and outputting the multiplier to a user for use in making a business decision.

10. A method of analyzing assets using a processor according to claim 9, further comprising the steps of:

determining which of the assets in the set of assets have information about loan default;

analyzing the default history of each of the assets having information about loan default; and generating a correlation between loan default and the level of each partition;

wherein assigning a multiplier to each partition includes assigning a risk multiplier to each partition based on the generated correlation between default and each partition, and wherein the risk multiplier is a gauge of default risk.

11. A method of analyzing assets using a processor according to claim 10, further comprising analyzing the severity for those assets of the set of assets that secure loans that have defaulted, and wherein assigning a multiplier to each partition includes assigning a severity multiplier to each partition.

12. A method of analyzing assets using a processor according to claim 9, wherein the multiplier comprises at least two generated correlations combined to form an overall multiplier.

13. A method of analyzing assets using a processor according to claim 10, wherein the multiplier comprises at least one generated correlation, including the risk multiplier, combined to form an overall multiplier.

14. A method of analyzing assets using a processor according to claim 12, further comprising the steps of:

receiving information about a subject asset, wherein the subject asset comprises the characteristic;

comparing the characteristic of the subject asset to the statistical distribution;

determining whether the characteristic of the subject asset falls within range set within the distribution; and assigning the multiplier to the subject asset based on the partition on which the characteristic of the subject asset falls.

15. A method of analyzing assets using a processor, the method comprising the steps of:

using a computer to compute a distribution for multiple characteristics of a set of assets;

comparing the characteristics of a subject asset to the distribution;

determining whether the characteristics of the subject asset fall within a predetermined range set within the population distribution, wherein the predetermined range represents an outlier;

assigning a risk multiplier to the subject asset based on a position in the predetermined range on which the characteristics of the subject asset falls, wherein the risk multiplier quantifies the risk selected from the group consisting of default risk, severity, and prepayment; and outputting the risk multiplier to a user for use in making a business decision.

16. A computer system for analyzing an asset comprising:

a memory including a program that (a) computes a distribution for a characteristic of a set of assets;

(b) sets a range defining an outlier in the distribution;

(c) partitions the range into at least one partition;

(d) assigns to each partition a multiplier representing how the characteristic affects a risk associated with an asset, wherein the risk associated with the asset is selected from the group consisting of default risk, severity, and prepayment;

(e) determines whether a characteristic of a subject asset fall within the range set within the distribution for the corresponding characteristic;

(f) assigns the multiplier corresponding to the partition on which the characteristic of the subject asset falls; and (g) outputs the multiplier to a user for use in making a business decision; and a processor that runs the program.

17. A computer system for analyzing an asset using a processor according to claim 16, wherein there are at least two characteristics, and the the program further:

(h) repeats steps (a)-(d) for each characteristic; and (i) means for generating generates a correlation between each of the multipliers for each characteristic to form an overall multiplier.

18. A computer system for analyzing an asset using a processor according to claim 17, wherein the program further:

determines whether a characteristic of a subject asset falls within the range set within the distribution for each of the corresponding characteristics; and assigns the multiplier corresponding to the partition on which each of the characteristics of the subject asset fall for those characteristics of the subject asset falling in the range set in the distribution corresponding to the characteristic.

19. A computer system for analyzing an asset using a processor according to claim 16, wherein the characteristic is not correlated with the risk associated with an asset.

20. A computer system for analyzing an asset using a processor according to claim 17, wherein at least one characteristic is not correlated with the risk associated with an asset.

21. A computer system for analyzing an asset, wherein the asset is one asset in a set of assets, comprising:

a memory including a program that (a) determines a correlation between at least two characteristics of an asset and a risk associated with the asset, wherein at least one of the two characteristics is an outlier;

(b) assigns a multiplier to the correlation, wherein the multiplier is used in a risk analysis;

(c) repeats step (a) for each asset in the set of assets;

(d) combines each corresponding correlation of step (c) to form a set for each correlation;

(e) generates a distribution for each set;

(f) correlates the risk associated with an asset to each position in the distribution;

(g) sets a range defining an outlier in each distribution;

(h) partitions each range into at least one partition;

(i) determines the risk associated with an asset based on the partition on which correlation of an asset falls;

(j) assigns a multiplier to each partition; and (k) outputs the multiplier to a user for use in making a business decision; and a processor that runs the program.

22. A computer system for analyzing an asset using a processor according to claim 21, wherein the program further:

determines whether the correlation between at least two characteristics of a subject asset falls within the range set within the distribution for the corresponding correlation;

assigns the multiplier corresponding to the partition on which the correlation between the at least two characteristics of the subject asset fall for those assets in the set of assets having correlations falling in the range; and computes a risk analysis of the subject asset using the multiplier.

23. A computer system for analyzing an asset using a processor according to claim 22, wherein the risk associated with the asset is selected from the group consisting of default risk, severity, and prepayment.

24. A computer system for analyzing assets comprising:

a memory including a program that receives information about a set of assets, wherein the information about the set of assets comprises a financial history for a loan secured by each asset in the set of assets, the financial history including information about actual performance of the loan, and wherein each asset in the set of assets has at least one characteristic capable of being quantified;

determines a correlation between a risk factor and the actual performance of each loan;

computes a statistical distribution for each characteristic;

sets a range defining an outlier in each statistical distribution;

partitions the range into at least one partition;

determines which of the assets in the set of assets sold in the past contain characteristics that fall in the range set in each of the corresponding statistical distributions, and for those assets falling in the range, determining the partition on which the corresponding characteristic falls;

compares the actual loan performance of the assets having characteristics that fall in the range set in each of the corresponding statistical distributions to the actual loan performance of the assets whose characteristics fall outside the range;

generates a correlation between the level of each partition and actual loan performance;

assigns a multiplier to each partition based on the generated correlation; and outputs the multiplier to a user for use in making a business decision; and a processor that runs the program.

25. A computer system for analyzing assets using a processor according to claim 24, wherein the program further:

determines which of the assets in the set of assets have information about loan default;

analyzes the default history of each of the assets having information about loan default; and generates a correlation between loan default and the level of each partition;

wherein assigning a multiplier to each partition includes assigning a risk multiplier to each partition based on the generated correlation between default and each partition, and wherein the risk multiplier is a gauge of default risk.

26. A computer system for analyzing assets using a processor according to claim 25, wherein the program further:

analyzes the severity for those assets of the set of assets that secure loans that have defaulted, and wherein assigning a multiplier to each partition includes assigning a severity multiplier to each partition.

27. A computer system for analyzing assets using a processor according to claim 24, wherein the multiplier comprises at least two generated correlations combined to form an overall multiplier.

28. A computer system for analyzing assets using a processor according to claim 25, wherein the multiplier comprises at least one generated correlation, including the risk multiplier, combined to form an overall multiplier.

29. A computer system for analyzing assets using a processor according to claim 27, wherein the program further:
receives information about a subject asset, wherein the subject asset comprises the characteristic;
compares the characteristic of the subject asset to the statistical distribution;
determines whether the characteristic of the subject asset falls within range set within the distribution; and
assigns the multiplier to the subject asset based on the partition on which the characteristic of the subject asset falls.

30. A computer system for analyzing assets comprising:
a memory including a program that
computes a distribution for multiple characteristics of a set of assets;
compares the characteristics of a subject asset to the distribution;
determines whether the characteristics of the subject asset fall within a predetermined range set within the population distribution, wherein the predetermined range represents an outlier;
assigns a risk multiplier to the subject asset based on a position in the predetermined range on which the characteristics of the subject asset falls, wherein the risk multiplier quantifies the risk selected from the group consisting of default risk, severity, and prepayment; and
outputs the risk multiplier to a user for use in making a business decision; and
a processor that runs the program.

* * * * *